United States Patent
Battiato et al.

(10) Patent No.: US 6,853,772 B2
(45) Date of Patent: Feb. 8, 2005

(54) FIBER GRATING WRITING INTERFEROMETER WITH CONTINUOUS WAVELENGTH TUNING AND CHIRP CAPABILITY

(75) Inventors: James M. Battiato, Austin, TX (US); John J. Simbal, Lakeway, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/436,836

(22) Filed: May 13, 2003

(65) Prior Publication Data

US 2004/0227927 A1 Nov. 18, 2004

(51) Int. Cl.$^7$ ................................................ G02B 6/34
(52) U.S. Cl. ........................................ 385/37; 385/52
(58) Field of Search ............................. 385/37, 106, 52

(56) References Cited

U.S. PATENT DOCUMENTS

| | | | |
|---|---|---|---|
| 5,058,977 A | * 10/1991 | Sorin | 385/30 |
| 5,388,173 A | 2/1995 | Glenn | |
| 6,490,390 B1 | 12/2002 | Wilcox | |
| 6,549,705 B1 | * 4/2003 | Laming et al. | 385/37 |
| 6,624,915 B1 | * 9/2003 | Kirkpatrick et al. | 359/3 |
| 6,636,665 B1 | * 10/2003 | Sceats et al. | 385/37 |
| 6,650,799 B2 | * 11/2003 | Lyons | 385/12 |
| 6,707,956 B1 | * 3/2004 | Kim et al. | 385/10 |
| 2002/0015919 A1 | * 2/2002 | Kristensen et al. | 430/321 |
| 2003/0035623 A1 | * 2/2003 | Wilcox et al. | 385/37 |

FOREIGN PATENT DOCUMENTS

| | | | |
|---|---|---|---|
| EP | 0872752 A1 | 10/1998 | |
| SE | WO 02071113 | * 9/2002 | G02B/6/16 |
| WO | WO 99/63371 A1 | 12/1999 | |
| WO | WO 01/06280 A1 | 1/2001 | |
| WO | WO 02/071113 A1 | 9/2002 | |
| WO | WO 02/071114 A1 | 9/2002 | |
| WO | WO 02/091531 A1 | 11/2002 | |

OTHER PUBLICATIONS

Y. Wang, et al; "Modified Talbot Interferometer for Fabrication of Fiber–Optic Grating Filter Over a Wide Range of Bragg Wavelength and Bandwidth Using a Single Phase Mask", *IEEE Journal of Lightwave Technology* (Oct. 2001); vol. 19, No. 10, pp. 1569–1573.

* cited by examiner

Primary Examiner—Frank G. Font
Assistant Examiner—K. Cyrus Kianni
(74) Attorney, Agent, or Firm—Gregg H. Rosenblatt

(57) ABSTRACT

A tunable interferometer for creating an interference pattern of variable periodicity at a fixed location is disclosed. The interferometer includes an optical element for splitting an input beam into a first write beam and a second write beam which are parallel to one another and have a variable distance therebetween. The interferometer also includes a beam directing element for receiving the parallel first and second write beams to intersect at the fixed location with an angle of intersection which is a function of the variable distance between the parallel first and second write beams received.

12 Claims, 4 Drawing Sheets

FIBER GRATING WRITING INTERFEROMETER WITH CONTINUOUS WAVELENGTH TUNING AND CHIRP CAPABILITY

FIELD

The present invention relates generally to the fabrication of Bragg gratings. More specifically, the present invention relates to the fabrication of Bragg gratings in optical waveguides or fibers using an interferometer.

BACKGROUND

A fiber grating is a periodic or aperiodic perturbation of the effective absorption coefficient and/or the effective refractive index of an optical waveguide. It can reflect a predetermined narrow or broad range of wavelengths of light incident on the grating, while passing all other wavelengths of light. Fiber gratings are useful as, for example, filters for wavelength division multiplexing (WDM), gain flattening filters for optical amplifiers, and stabilizers for laser diodes used to pump optical amplifiers.

Typically, fiber gratings are made by laterally exposing the core of a single-mode fiber to a periodic pattern of intense ultraviolet light. The exposure produces an increase in the refractive index of the fiber's core, creating a index modulation according to the exposure pattern. This fixed index modulation is called a grating. At each periodic refraction change, a small amount of light is reflected. All the reflected light signals combine coherently to one large reflection at a particular wavelength when the grating period is approximately half the input light's wavelength. This is referred to as the Bragg condition, and the wavelength at which this reflection occurs is called the Bragg wavelength.

For light signals at wavelengths other than the Bragg wavelength, which are not phase matched, the grating is essentially transparent. Therefore, light propagates through the grating with negligible attenuation or signal variation. Only those wavelengths that satisfy the Bragg condition are affected and strongly back-reflected. The ability to accurately preset and maintain the grating wavelength is a fundamental feature and advantage of fiber Bragg gratings.

As is known, a grating can be produced by using an interferometer to cause two or more optical waves (write beams) to interfere within the core of the fiber, thereby producing an interference pattern therein. The period of a fiber Bragg grating formed by an interferometer can be described by the well-known Bragg equation $$2n\Lambda \sin \theta = m\lambda \quad \text{(Eq. 1)}$$

where $\Lambda$ is the grating period, $\theta$ is the half-angle between the write beams, $\lambda$ is the wavelength of the write beams used to form the grating, and n is the index of refraction. The period of a grating need not be uniform. A continuous change in the period of the grating as a function of position along the grating is known as chirp. Chirped gratings reflect different wavelengths at different points along the grating as dictated by Equation 1. As can be seen in this equation, the grating period can be tuned by either varying the write wavelength or the inter-beam angle between the write beams.

In the latter approach, a problem with conventional fabrication methods of fiber Bragg gratings is the inability to change the period of the grating during the fabrication process without changing the position at which the write beams overlap in space or where the fiber is located with respect to these interfering beams. Thus, the need remains for an interferometer which allows for smooth and continuous changes in the period of a fiber Bragg grating during fabrication without repositioning the fiber or the overlap position of the beams.

BRIEF SUMMARY

One aspect of the present invention is a tunable interferometer for creating an interference pattern of variable periodicity at a fixed location. In a first exemplary embodiment of the current invention, a tunable interferometer for creating an interference pattern of variable periodicity at a fixed location comprises a beam separating stage for splitting with a beam splitter an input beam into a first write beam and a second write beam which are parallel to one another and have a variable distance therebetween and a beam combining stage for receiving the parallel first and second write beams and directing the first and second write beams to intersect at the fixed location with an angle of intersection which is a function of the variable distance between the parallel first and second write beams received wherein the distance between the beams is controlled by translation of the beam splitter.

In a second exemplary embodiment of the current invention, a system for creating gratings having interference patterns of variable periodicity in an optical waveguide comprises a light source for providing an input beam, a beam separating stage for splitting with a beam splitter the input beam into a first write beam and a second write beam which are parallel to one another and have a variable distance therebetween, and a beam combining stage for receiving the parallel first and second write beams and directing the first and second write beams to intersect with an angle of intersection which is a function of the variable distance between the parallel first and second write beams received wherein the distance between the beams is controlled by translation of the beam splitter.

In a third exemplary embodiment of the current invention, a system for creating an interference pattern in an optical waveguide comprises a light source for producing a first write beam and a second write beam and a reflecting telescope for combining the first write beam and second write beam to a focal plane in the optical waveguide to create an interference pattern in the optical waveguide.

In a fourth exemplary embodiment of the current invention, a method of creating an interference pattern of variable periodicity in an optical waveguide of the current invention comprises separating with a beam splitter an input beam into a first write beam and a second write beam which are parallel to one another, directing the first write beam and the second write beam to intersect with an angle of intersection that is a function of the variable distance between the parallel first and second write beams received, and varying the distance between the parallel first write beam and the second write beam by translating the beam splitter to alter the inter-beam angle between the write beams and the optical axis.

BRIEF DESCRIPTION OF THE DRAWINGS

FIG. 1b is a cross-section view of an alternative embodiment of the tunable interferometer shown in FIG. 1a.

FIG. 1c is a cross-section view of another alternative embodiment of the tunable interferometer shown in FIG. 1a.

DETAILED DESCRIPTION

Figure 1A:
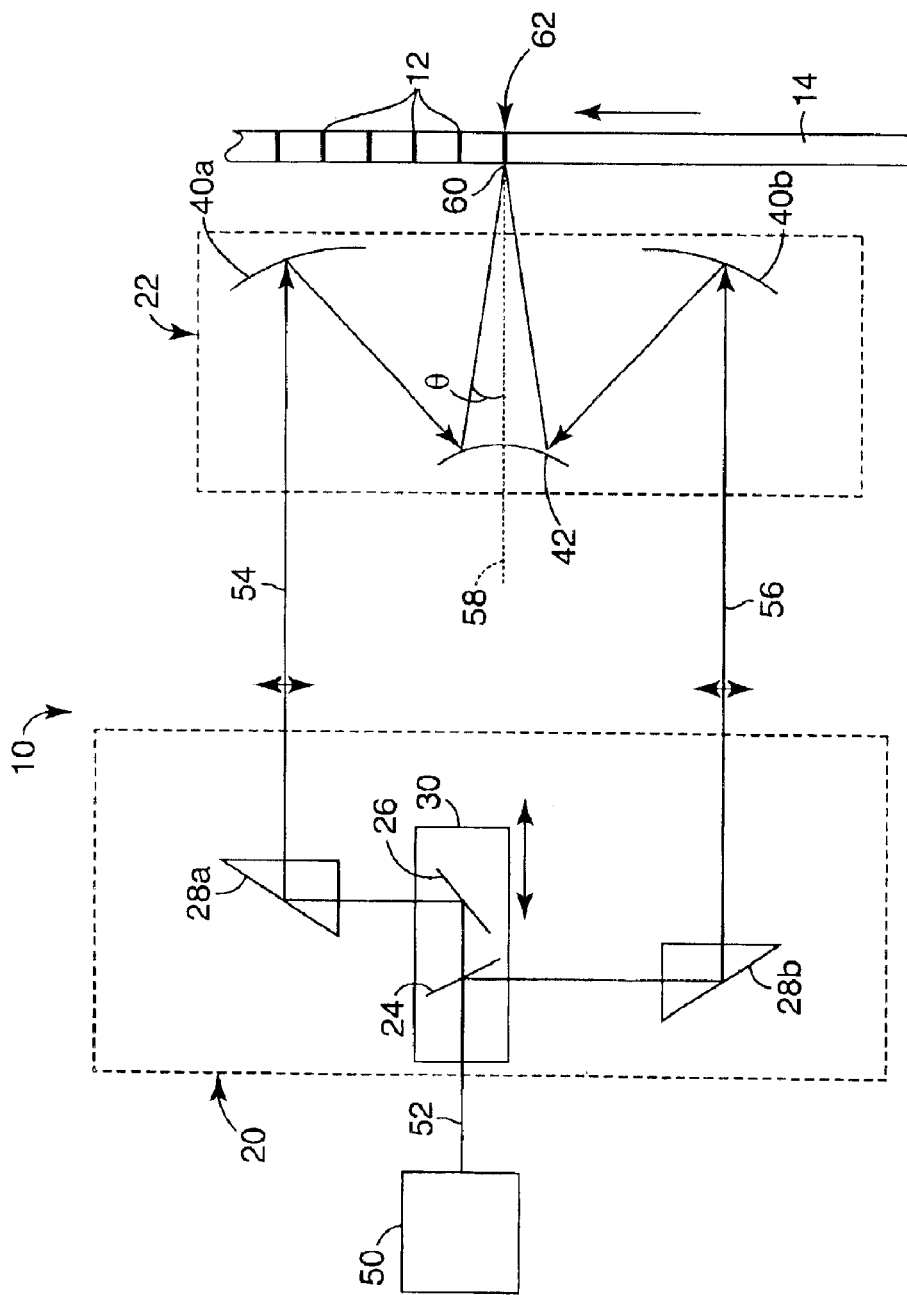
FIG. 1a is a cross-section view of a tunable interferometer according to an embodiment of the present invention for creating an interference pattern of variable periodicity in an optical waveguide.

FIG. 1a is a cross-section view of an interferometer 10 for creating interference patterns 12 of variable periodicity in optical waveguide 14 according to an embodiment of the present invention. Interferometer 10 includes beam separating stage 20 and reflecting telescope 22. Beam separating stage 20 includes beam splitter 24, reflector 26, and prisms 28a and 28b. Beam splitter 24 and reflector 26 are mounted on motorized platform 30 such that beam splitter 24 and reflector 26 are translatable parallel with input beam 52. Reflecting telescope 22 has a configuration including primary reflectors 40a and 40b and secondary reflector 42. Primary reflectors 40a and 40b represent a cross-section of a typical reflecting telescope primary reflector, which is a toroid having a concave reflective surface.

In operation, light source 50, which is preferably a source of actinic radiation such as a laser, provides input beam 52 to beam separating stage 20. Input beam 52 is incident on beam splitter 24 and is split into two writing beams: first write beam 54 and second write beam 56. Beam splitter 24 is preferably a 50/50 beam splitter or a phase mask. In the former case, input beam 52 is split such that 50% of input beam 52 is transmitted from beam splitter 24 as first write beam 54 and 50% of input beam 52 is reflected from beam splitter 24 as second write beam 56. In the latter case, input beam 52 is split into two diffraction orders, +1 and −1, with an equal power level. Other ratios of transmitted and reflected light are possible as design requirements dictate.

After being transmitted by beam splitter 24, first write beam 54 is directed to reflecting telescope 22 via reflector 26 and prism 28a. Similarly, after being reflected by beam splitter 24, second write beam 56 is directed to reflecting telescope 22 via prism 28b.

First write beam 54 and second write beam 56 are reflected from the primary reflector (shown in cross-section as primary reflectors 40a and 40b) of reflecting telescope 22 to secondary reflector 42. The angle of incidence of first write beam 54 and second write beam 56 on secondary reflector 42 is based on the reflecting angle and type of primary reflector, and on the point of incidence of first write beam 54 on primary reflector 40a and of second write beam 56 on primary reflector 40b. First write beam 54 and second write beam 56 are reflected from secondary reflector 42 toward optical waveguide 14 at an inter-beam half angle θ with respect to optical axis 58. First write beam 54 and second write beam 56 intersect at focal plane 60 and interfere with each other at region 62 in the core of optical waveguide 14, thereby producing an interference pattern therein. The exposure produces a permanent increase in the refractive index of the fiber's core, creating a fixed index modulation, or grating, according to the exposure pattern.

As discussed above, the periodicity of the fixed index modulation is a function of the wavelength of the input beam of the interferometer and of the inter-beam half angle between first write beam 54 and second write beam 56, pursuant to the Bragg equation (Eq. 1). Thus, to alter the periodicity of the grating, the inter-beam half angle θ of first write beam 54 and second write beam 56 may be varied.

In interferometer 10, the inter-beam half angle θ of first write beam 54 and second write beam 56 at focal plane 60 may be varied by altering the point of incidence of write beams 54 and 56 on primary reflectors 40a and 40b, respectively. In the embodiment shown in FIG. 1a, this is accomplished by translating beam splitter 24 and reflector 26 with motorized platform 30 parallel with input beam 52. Preferably, beam splitter 24 and reflector 26 are translated simultaneously parallel with input beam 52 such that movement of first write beam 54 and second write beam 56 is symmetric. This, in turn, maintains symmetry of distance of beams 54 and 56 from optical axis 58. Motorized platform 30 may employ, for example, an electromechanical element which allows for small movements of beam splitter 24 and reflector 26 such that small changes in the grating period of the interference pattern may be achieved.

As beam splitter 24 and reflector 26 are moved, first write beam 54 and second write beam 56 are translated along the hypotenuse of prisms 28a and 28b, respectively, resulting in a change in the distance between first write beam 54 and second write beam 56 as they leave prisms 28a and 28b. For example, when beam splitter 24 and reflector 26 are moved to the left in FIG. 1a, the distance between first write beam 54 and second write beam 56 becomes smaller. Conversely, when beam splitter 24 and reflector 26 are moved to the right in FIG. 1a, the distance between first write beam 54 and second write beam 56 becomes larger. This, in turn, shifts the point of incidence of first write beam 54 on primary reflector 40a and of second write beam 56 on primary reflector 40b. Write beams 54 and 56 preferably shift symmetrically about the optical axis of primary reflectors 40a and 40b as beam splitter 24 and reflector 26 are moved. The point of incidence of write beams 54 and 56 on secondary reflector 42 is thus translated, which causes a change in the inter-beam half angle θ of first write beam 54 and second write beam 56. Pursuant to the Bragg equation (Eq. 1), this changes the periodicity of the grating written without changing the location of focal plane 60. In coordination with the movement of optical waveguide 14 in the plane perpendicular to the write beams 54 and 56, a interference pattern 12 in the form of a chirped grating may be produced along optical waveguide 14 by moving beam splitter 24 and reflector 26. Beam splitter 24 and reflector 26 may be moved to predetermined positions to create gratings having a specific periodicity along optical waveguide 14 as optical waveguide 14 is moved in longitudinal direction perpendicular to focal plane 60. Alternatively, multiple gratings with different periods may be multiplexed at that same physical location in optical waveguide 14 to reflect multiple wavelengths. It should be noted that various other devices may be used in place of beam separating stage 20 to translate first write beam 54 and second write beam 56 along the surface of incidence of the primary reflectors 40a and 40b to vary the inter-beam angle between first write beam 54 and second write beam 56.

Reflecting telescope 22 of interferometer 10 in FIG. 1a includes a primary reflector (40a and 40b) having a parabolic reflective surface and secondary reflector 42 having a hyperbolic reflective surface. The shape of the primary and secondary reflectors used in reflecting telescope 22 may be varied for differing system requirements. For example, two other possible mirror configurations include (1) a parabolic primary reflector and a flat secondary reflector 72 (FIG. 1b), and (2) a parabolic primary reflector and a concave spherical secondary reflector 82 (FIG. 1c). These varying mirror configurations allow for different focal ratios, or f-numbers (the effective focal length of the mirror divided by the diameter of the mirror). This results in a variation of the distance from the primary reflector at which the focal plane will occur. It should be noted that any combination of spherical, aspherical, holographic and flat reflectors may be used for the primary and secondary reflectors, and the following descriptions are provided for illustrative purposes.

To write a grating in, for example, the conventional band (C-band) fiber window, the Bragg angle is chosen to correspond with a wavelength between 1530 nm and 1570 nm. According to Eq. 1, this corresponds to an inter-beam half angle of between 13.29° and 13.67° to achieve the desired grating wavelength range. Based on these values, the shape of the reflectors in the reflecting telescope and the region of incidence of first write beam 54 and second write beam 56 on primary reflectors 40a and 40b, respectively, can be tailored to achieve the desired inter-beam angle.

For example, in reflecting telescope 22 as in FIG. 1a, a parabolic primary reflector having an f-number of about f/4 and a focal length of 400 mm may be used, with first write beam 54 and second write beam 56 having a 4 mm diameter incident thereupon. The combination of the parabolic primary reflector and hyperbolic secondary reflector with these dimensions results in an effective focal length of 200 mm. Consequently, when first write beam 54 and second write beam 56 are decentered +/−46.600 mm from the optical axis of the primary reflector, the inter-beam half angle between first write beam 54 and second write beam 56 after reflecting off of secondary reflector 42 is 13.29°. When first write beam 54 and second write beam 56 are decentered +/−47.945 mm from the optical axis of the primary reflector, the inter-beam half angle between first write beam 54 and second write beam 56 after reflecting off of secondary reflector 42 is 13.67°. Thus, when the write beams are translated across the primary reflector by a total of about 1.345 mm, the desired angular change between first write beam 54 and second write beam 56 is produced to cover the full C-band.

Figure 1B:
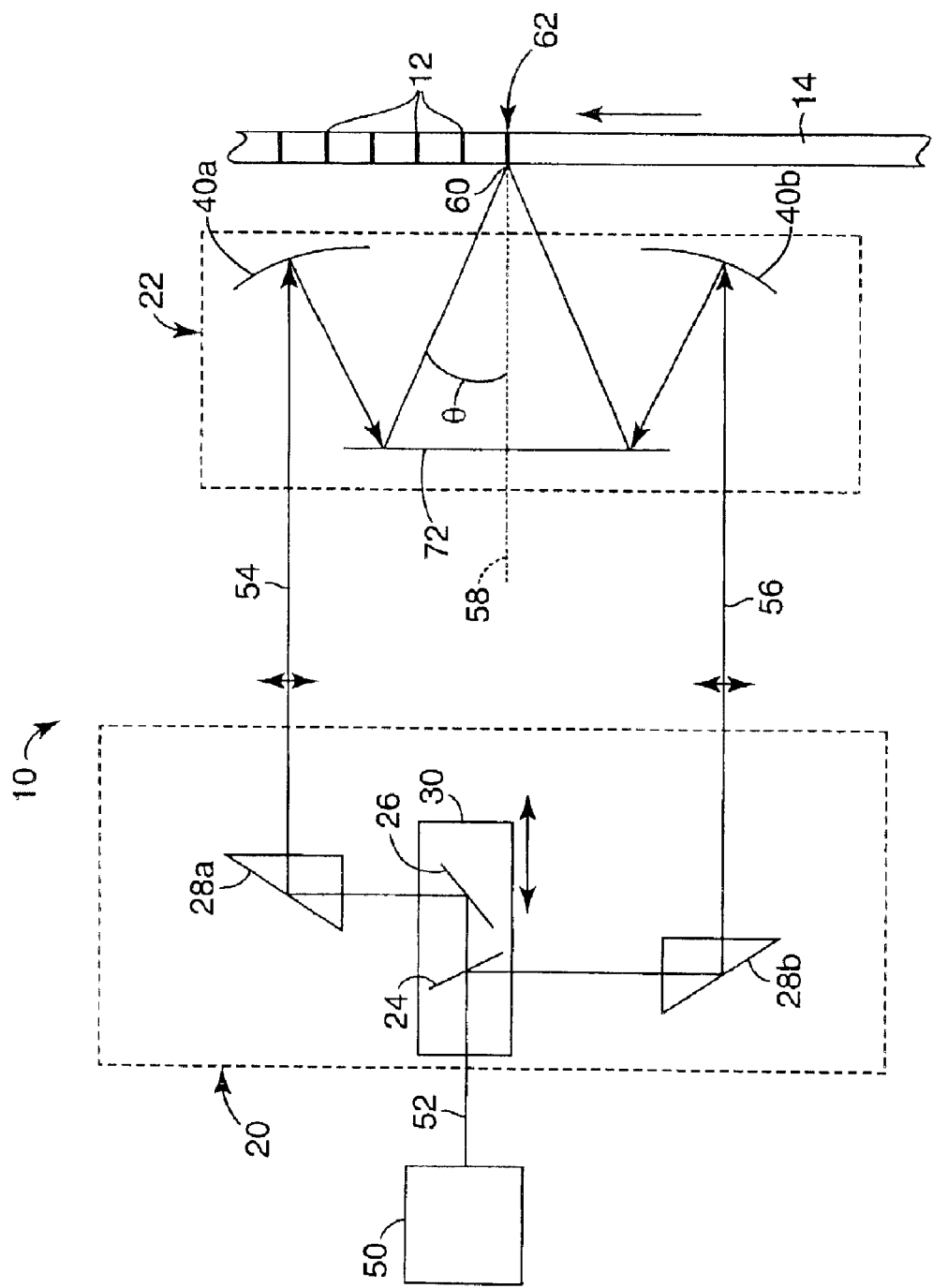
Figure 1C:
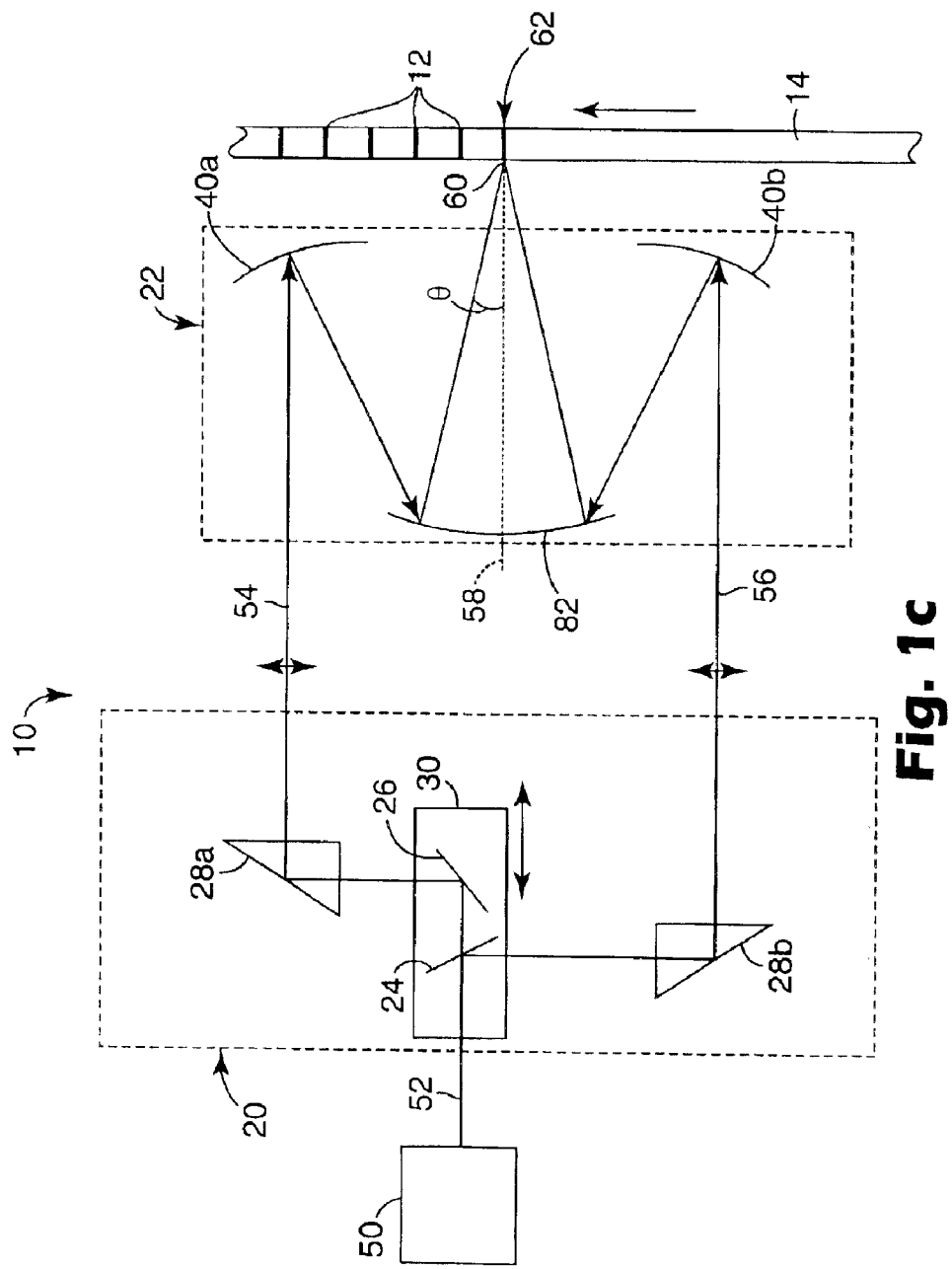

As another example, in a reflecting telescope as in FIG. 1b, a parabolic primary reflector having an f-number of f/2 and a focal length of 200 mm may be used, with a flat secondary reflector 72, with first and second write beams having a 4 mm diameter incident thereupon. When first write beam 54 and second write beam 56 are decentered +/−46.600 mm from the optical axis of the primary reflector, the inter-beam half angle between first write beam 54 and second write beam 56 after reflecting off of secondary reflector 42 is 13.29°. When first write beam 54 and second write beam 56 are decentered +/−47.945 mm from the optical axis of the primary reflector, the inter-beam half angle between first write beam 54 and second write beam 56 after reflecting off of secondary reflector 42 is 13.67°. Thus, when the write beams are translated across the primary reflector by a total of about 1.345 mm, the desired angular change between first write beam 54 and second write beam 56 is produced to cover the full C-band.

As a further example, in a reflecting telescope as in FIG. 1c, parabolic primary reflector having an f-number of about f/4 and a focal length of 400 mm may be used with a concave spherical secondary reflector 82, with first and second write beams having a 4 mm diameter incident thereupon. The combination of the parabolic primary and spherical secondary reflectors with these dimensions results in an effective focal length of 200 mm. When first write beam 54 and second write beam 56 are decentered +/−46.565 mm from the optical axis of the primary reflector, the inter-beam half angle between first write beam 54 and second write beam 56 after reflecting off of secondary reflector 82 is 13.29°. When first write beam 54 and second write beam 56 are decentered +/−47.945 mm from the optical axis of the primary reflector, the inter-beam half angle between first write beam 54 and second write beam 56 after reflecting off of secondary reflector 82 is 13.67°. Thus, in this case, when the write beams are translated across the primary reflector by a total of about 1.380 mm, the desired angular change between first write beam 54 and second write beam 56 is produced to cover the full C-band.

Figure 2:
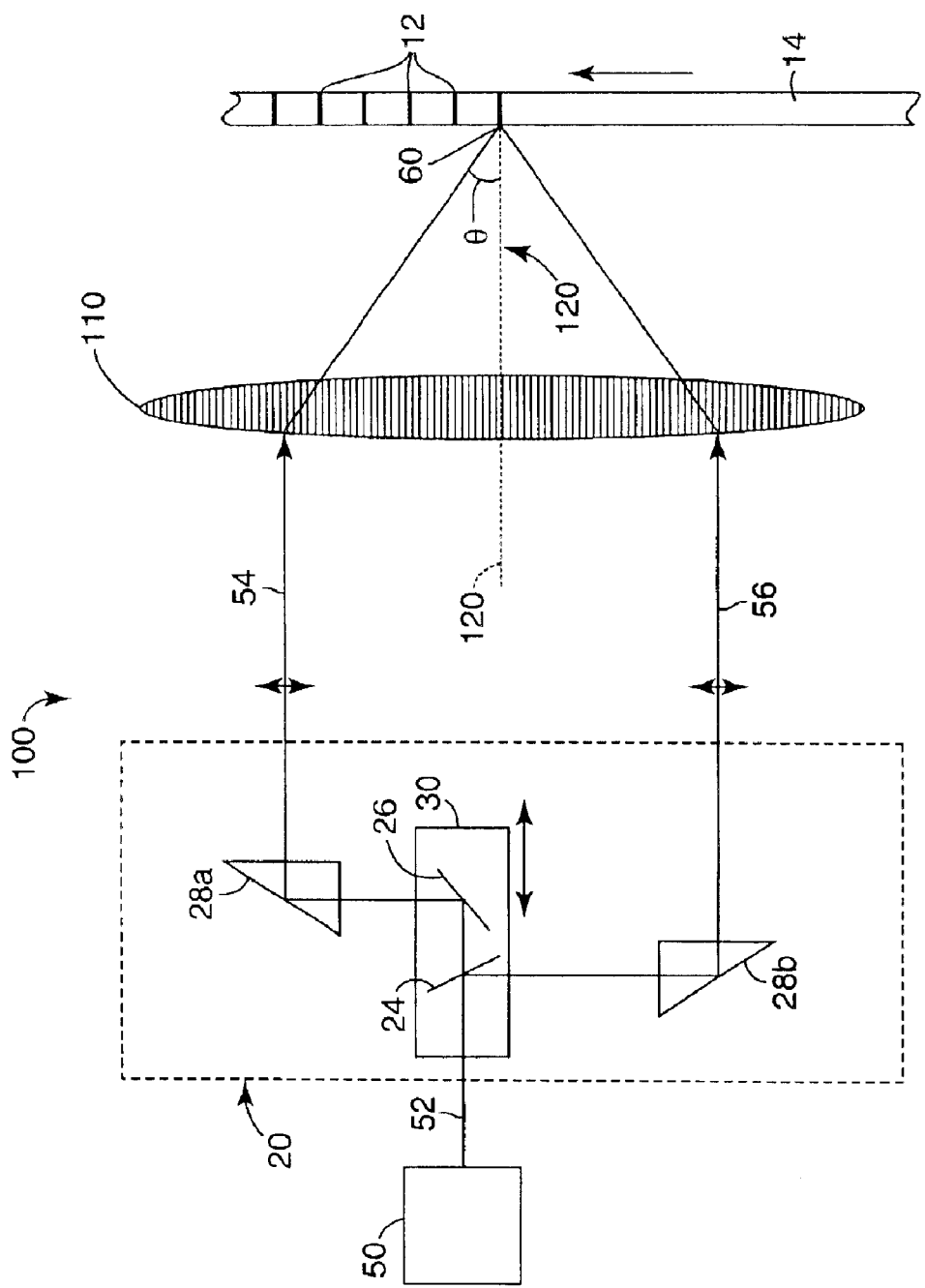
FIG. 2 is a schematic view of a tunable interferometer according to another embodiment of the present invention for creating an interference pattern of variable periodicity in an optical waveguide.

FIG. 2 is a schematic view of an interferometer 100 for creating interference pattern 12 of variable periodicity in optical waveguide 14 according to another embodiment of the present invention. Interferometer 100 includes beam separating stage 20 and refractive lens 110. Beam separating stage 20 includes beam splitter 24, reflector 26, and prisms 28a and 28b. Beam splitter 24 and reflector 26 are mounted on motorized platform 30 such that beam splitter 24 and reflector 26 are translatable parallel to input beam 52.

The operation of interferometer 100 is similar to that of interferometer 10 shown in FIGS. 1a, 1b, and 1c. Light source 50 provides input beam 52 to beam separating stage 20. Input beam 52 is incident on beam splitter 24 and is split into two writing beams: first write beam 54 and second write beam 56. Beam splitter 24 is preferably a 50/50 beam splitter or a phase mask. In the former case, input beam 52 is split such that 50% of input beam 52 is transmitted from beam splitter 24 as first write beam 54 and 50% of input beam 52 is reflected from beam splitter 24 as second write beam 56. In the latter case, input beam 24 is split into two diffraction orders, +1 and −1, with an equal power level. Other ratios of transmitted and reflected light are possible as design requirements dictate.

After being transmitted by beam splitter 24, first write beam 54 is directed to refractive lens 110 via reflector 26 and prism 28a. Similarly, after being reflected by beam splitter 24, second write beam 56 is directed to refractive lens 110 via prism 28b.

First write beam 54 and second write beam 56 pass through refractive lens 110 and are refracted at an angle based on the curvature of refractive lens 110, and on the point of incidence of first write beam 54 and second write beam 56 on refractive lens 110. First write beam 54 and second write beam 56 are passed through refractive lens 110 to optical waveguide 14 at an inter-beam half angle θ with respect to optical axis 120. First write beam 54 and second write beam 56 intersect at focal plane 60 and interfere with each other at region 62 in the core of optical waveguide 14, thereby producing an interference pattern therein. The exposure produces a permanent increase in the refractive index of the fiber's core, creating a fixed index modulation, or grating, according to the exposure pattern.

Translation of the first write beam 54 and second write beam 56 across refractive lens 110 varies the angle between the write beams, while keeping focal plane 60 at a fixed location. In interferometer 100, the inter-beam angle between first write beam 54 and second write beam 56 at focal plane 60 may be varied by altering the points of incidence of write beams 54 and 56 on refractive lens 110. In the embodiment shown in FIG. 2, this is accomplished by translating beam splitter 24 and reflector 26 along motorized platform 30 parallel with input beam 52. Preferably, beam splitter 24 and reflector 26 are translated simultaneously along motorized platform 30 such that movement of first write beam 54 and second write beam 56 remains symmetric. This, in turn, maintains symmetry of distance of write beams 54 and 56 from optical axis 120. Motorized platform 30 may employ, for example, an electromechanical element which allows for small movements of beam splitter 24 and reflector 26.

As beam splitter 24 and reflector 26 are moved, first write beam 54 and second write beam 56 are translated along the hypotenuse of prisms 28a and 28b, respectively, resulting in a change in the distance between first write beam 54 and second write beam 56 as they leave prisms 28a and 28b. For example, when beam splitter 24 and reflector 26 are moved to the left in FIG. 2, the distance between first write beam 54 and second write beam 56 becomes smaller. Conversely, when beam splitter 24 and reflector 26 are moved to the right in FIG. 2, the distance between first write beam 54 and second write beam 56 becomes larger. This, in turn, shifts the point of incidence of first write beam 54 and second write beam 56 on refractive lens 110. Write beams 54 and 56 preferably shift symmetrically about the optical axis 120 of refractive lens 110 as beam splitter 24 and reflector 26 are moved. By shifting the point of incidence of write beams 54 and 56 on refractive lens 110, a change in inter-beam half angle θ of first write beam 54 and second write beam 56 occurs. Pursuant to the Bragg equation (Eq. 1), this changes the periodicity of the grating written without changing the location of focal plane 60. In coordination with the movement of optical waveguide 14 in the plane perpendicular to the write beams, an interference pattern 12 in the form of a chirped grating may be produced along optical waveguide 14 by moving beam splitter 24 and reflector 26 along motorized platform 30. Beam splitter 24 and reflector 26 may be moved along motorized platform 30 to predetermined positions to create gratings having a specific periodicity along optical waveguide 14 as optical waveguide 14 is moved longitudinal direction perpendicular to focal plane 60. Alternatively, multiple gratings with different periods may be multiplexed at that same physical location in optical waveguide 14 to reflect multiple wavelengths. It should be noted that various other devices may be used in place of optical element 20 to translate first write beam 54 and second write beam 56 along the surface of incidence refractive lens 110 to vary the inter-beam angle between first write beam 54 and second write beam 56.

The shape and curvature of refractive lens 110 not only determines the inter-beam half angle θ of first write beam 54 and second write beam 56, but also determines the distance from refractive lens 110 at which focal plane 60 occurs. One example configuration for refractive lens 110 includes a planar incidence surface and a spherical refractive surface. For the present invention, the shape and curvature of refractive lens 110 must be chosen such that first write beam 54 and second write beam 56 form an appropriate Bragg angle, θ, pursuant to Eq. 1. For example, to write a grating in the conventional band (C-band) fiber window, the Bragg angle is chosen to correspond with a wavelength between 1530 nm and 1570 nm. To get the necessary Bragg angle for the C-band, refractive lens 110 must have an f-number of f/2. For a 5" diameter convex spherical lens with a focal length of 10", the write beams must reach refractive lens 110 at about +/−2.3" from optical axis 120 to form the correct half angle between the write beams (between 13.29° and 13.67°). Lenses having other shapes and curvatures may be used, and the point of incidence of write beams 54 and 56 on refractive lens 110 adjusted accordingly, to provide the desired Bragg angle at focal plane 60. Alternatively, refractive lens 110 may also be replaced by a multi-element lens with all spherical surfaces, a diffractive optical element, or a holographic optical element to achieve the same result as the single refractive lens as shown in FIG. 2.

In summary, one aspect of the present invention is a tunable interferometer for creating an interference pattern of variable periodicity at a fixed location. The interferometer includes an optical element for splitting an input beam into a first write beam and a second write beam which are parallel to one another and have a variable distance therebetween. The interferometer also includes a beam directing element for receiving the parallel first and second write beams to intersect at the fixed location with an angle of intersection which is a function of the variable distance between the parallel first and second write beams received. In one embodiment of the present invention, the beam combining stage comprises a reflecting telescope. In another embodiment of the present invention, the beam combining stage comprises a refractive lens. The tunable interferometer of the present invention is typically used in a system for creating gratings having interference patterns of variable periodicity in an optical waveguide. A light source, such as a laser, is included in the system to provide an input beam to the interferometer. In a preferred embodiment of the system, a device for causing relative longitudinal motion of the optical waveguide is also provided to create multiple interference patterns in the optical waveguide. The present invention allows for smooth and continuous changes in the period of a fiber Bragg grating during fabrication without repositioning of the optical waveguide or the light source.

Although the present invention has been described with reference to preferred embodiments, workers skilled in the art will recognize that changes may be made in form and detail without departing from the spirit and scope of the invention. For example, the interferometers of the present invention may also be used for the fabrication of holograms in a holographic recording medium.

What is claimed is:

1. A tunable interferometer for creating an interference pattern of variable periodicity at a fixed location, the interferometer comprising:
    a beam separating stage for splitting with a beam splitter an input beam into a first write beam and a second write beam which are parallel to one another, symmetrical about the optical axis, and have a variable distance therebetween; and
    a beam combining stage for receiving the parallel first and second write beams and directing the first and second write beams to intersect at the fixed location with an angle of intersection which is a function of the variable distance between the parallel first and second write beams received,
    wherein the distance between the beams is controlled by translation of the beam splitter, and wherein the beam combining stage comprises a reflecting telescope.

2. The interferometer of claim 1, further comprising:
    an electromechanically controlled platform for moving the beam separating stage to vary the distance between the parallel first and second write beams.

3. The interferometer of claim 2, wherein the first and second write beams are translated along a receiving surface of the beam combining stage by moving the beam separating stage.

4. The interferometer of claim 1, wherein the input beam is a laser.

5. The interferometer of claim 1, wherein the beam separating stage includes a 50/50 beam splitter which transmits 50% of the input beam as the first write beam and reflects 50% of the input beam as the second write beam.

6. The interferometer of claim 1, wherein the beam separating stage includes a phase mask.

7. A system for creating gratings having interference patterns of variable periodicity in an optical waveguide, the system comprising:

a light source for providing an input beam;

a beam separating stage for splitting with a beam splitter the input beam into a first write beam and a second write beam which are parallel to one another, symmetric about the optical axis, and have a variable distance therebetween; and a beam combining stage for receiving the parallel first and second write beams and directing the first and second write beams to intersect with an angle of intersection which is a function of the variable distance between the parallel first and second write beams received, wherein the distance between the beams is controlled by translation of the beam splitter, and wherein the beam combining stage comprises a reflecting telescope.

8. The system of claim 7, wherein the light source comprises a source of actinic radiation.

9. The system of claim 8, wherein the light source is a laser.

10. The system of claim 7, further comprising:

a device for causing relative longitudinal motion of the optical waveguide to create multiple interference patterns in the optical waveguide.

11. The system of claim 10, wherein the multiple interference patterns are part of a chirped grating.

12. The system of claim 10, wherein the multiple interference patterns are part of a multiplexed grating.

* * * * *